Dec. 19, 1939.  G. J. HENRY  2,183,614
COUPLING STRUCTURE
Filed Dec. 22, 1937
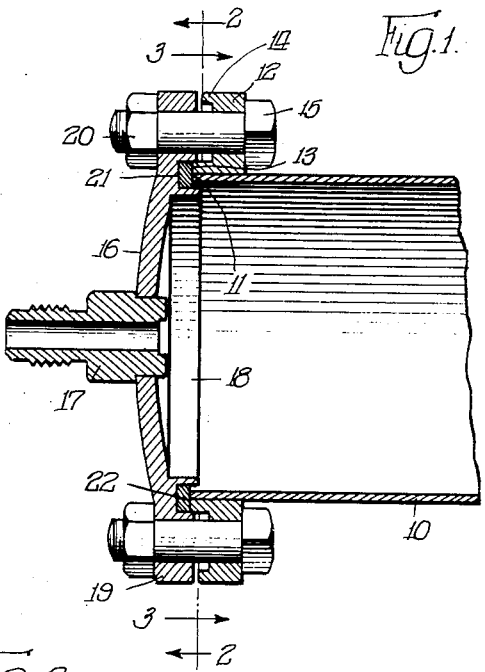
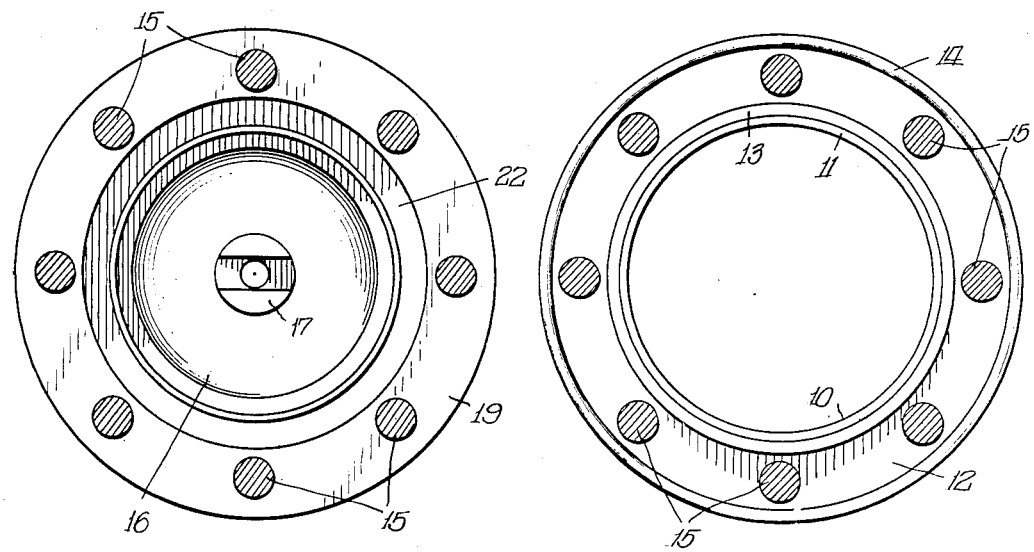
Inventor:
Guy J. Henry,
By Cromwell, Greist & Warden
Attys.

Patented Dec. 19, 1939

2,183,614

UNITED STATES PATENT OFFICE 2,183,614

COUPLING STRUCTURE

Guy J. Henry, Chicago, Ill.

Application December 22, 1937, Serial No. 181,170

1 Claim. (Cl. 285—130)

The present invention has to do with couplings of the bolted flange type commonly used for connecting members of various sorts, such as pipes, to the ends of tubular casings.

The principal object of the invention is to provide an improved coupling which can be used to connect members together in tightly sealed relation without danger of injury to the parts through an excessive tightening of the fastening bolts.

Another object is to provide an annular coupling structure of the character described in which inner bearing portions are used in combination with outer fulcruming abutments and intermediate clamping means.

Still another object is to provide an improved coupling with which a head member or some other kind of member may be easily secured to a casing member, the coupling being simple and reliable in affording a securely sealed connection between the members without danger of injurious deformation.

A preferred embodiment of the invention is presented herein for the purpose of exemplification, but it will of course be appreciated that the invention is susceptible of embodiment in other structurally modified forms.

In the accompanying drawing:

Fig. 1 is a longitudinal sectional view taken through the center of a coupling device constructed in accordance with the invention;

Fig. 2 is a transverse sectional view taken along line 2—2 of Fig. 1; and

Fig. 3 is a transverse section taken along the line 3—3 of Fig. 1, this being similar to that of Fig. 2 but viewing the device in the opposite direction.

In the coupling of casings and the like to other members it is common practice to provide marginal flanges which are joined together by bolts, suitable gasket members being employed to seal the joint against leakage of fluids. The improved coupling structure shown in the drawing is of this general type, but is constructed to afford a more satisfactory union between the members to be coupled than the devices known heretofore.

As shown in the drawing, a main casing 10, which may be a strainer cylinder, dehydrator casing, filter casing or the like, is provided adjacent its end 11 with an outer flange member indicated generally at 12. This annular ring or flange 12 has an inner leg 13 extending alongside the outer surface of the casing and terminating in the place of the end 11 thereof to provide a shelf or tongue of substantially greater width than the thickness of the casing member.

The flange 12 is also provided with an outer leg 14 which is concentric with the inner leg 11 but somewhat shorter than the latter. The channel portion comprising the body of the flange 12 between the legs 13 and 14 is orificed to provide openings for the bolts 15 by which the members to be joined are secured together. Casing 10 and the flange 12 are secured together as by brazing so that the end 11 of the casing and inner leg 13 of the flange form a permanent shoulder or tongue of substantial width.

The casing 10 is shown as coupled with a head member 16 carrying an outlet conduit 17 of greatly reduced internal cross-sectional area. Conduit 17 may be an inlet or outlet connection for the casing 10 where it is desired to provide a reduced velocity and increased treating space within the casing. The coupling construction will be recognized as applicable to the joining together of other structures such as cylinders to cylinders.

The head 16 is of general circular shape and is provided with an inner cylindrical flange member 18 which extends within the casing 10 adjacent the wall thereof.

An outer flange portion 19 is provided on the head member and this flange cooperates with the flange 12 to provide securement of the head member to the casing. Bolts 15 pass through suitably spaced orifices in the flange 19 and are secured by conventional nuts 20.

Between the inner cylindrical portion 18 and the flange 19 is provided an annular groove or channel 21 which is designed to receive the end 11 of the casing and the leg 13 of the flange 12 as shown in Fig. 1. To provide a suitable seal between the casing and head member a compressible gasket 22 composed of rubber or other suitable material is fitted within the channel 21.

It will be noted that the depth of the channel 21 is greater than the distance between the outer leg 14 of flange 12 and the outer portion of flange 19.

In assembling the coupling construction the gasket member is placed in channel 21 and the head 16 is positioned against the end of the casing so that the channel 21 encompasses the inner leg 13 of the flange 12 and the end of the casing in tongue and groove engagement. The orifices in the two flanges are placed in alignment and bolts 15 are inserted therethrough. The nuts 20 are tightened to bring the end of the casing in compressed relation with respect to the gasket 22.

Abutment leg 14 of flange 12 is preferably of such length with respect to the thickness of the compressible gasket 22 and channel 21 as to cause the same to contact the under surface of flange 19 before the limit of compression of the gasket 22 has been reached. In any event, the leg 14 is of such length as to contact the flange 19 before any injurious distortion of either of the flanges has taken place. Should the leg 14 contact the flange 19 before the sealing leg 13 has been drawn into tightly sealed association with the gasket 22, due to the presence of a worn or unusually thin gasket, the leg 14 will act as a fulcrum in combination with the tightening means to permit further inward movement of the leg 13 into fully sealed engagement. By reason of the relation of the abutment leg 14 and the upper flange to the tongue and groove connection between the channel 21 and the end of the casing, the nuts 20 cannot be tightened to such an extent as to injuriously distort the flanges.

I claim:

A coupling structure comprising two members having annular flanges adapted to be drawn together, said members having complementary tongue and groove portions adjacent the inner edges of the flanges, a compressible gasket between the tongue and groove portions, an axially extending annular rib adjacent the outer edge of one of the flanges for abutment with a corresponding portion of the other flange to prevent the flanges from being drawn together except at the location of the rib, and clamping bolts passing through the flanges in the spaced portions thereof between the outer rib and the inner tongue and groove portions, said gasket and tongue and groove portions being so proportioned with respect to said rib as to result in compression of the gasket upon the bolts being drawn up before abutment of the rib with the opposed portion of the other flange, and said rib upon engagement with the opposed portion of the other flange providing a fulcrum for further compression of the gasket through the tongue upon further tightening of the bolts.

GUY J. HENRY.